United States Patent
Sandlin et al.

(10) Patent No.: US 11,807,546 B2
(45) Date of Patent: Nov. 7, 2023

(54) PROCESS FOR PRODUCING RADIOACTIVE DRY SN-117M TETRAIODIDE RADIOCHEMICAL

(71) Applicant: Serene, LLC, The Woodlands, TX (US)

(72) Inventors: Zechariah David Sandlin, Angleton, TX (US); Jaime Simon, Angleton, TX (US); Nigel R. Stevenson, Sugar Hill, GA (US)

(73) Assignee: Serene, LLC, The Woodlands, TX (US)

( * ) Notice: Subject to any disclaimer, the term of this patent is extended or adjusted under 35 U.S.C. 154(b) by 542 days.

(21) Appl. No.: 16/762,561

(22) PCT Filed: Nov. 9, 2018

(86) PCT No.: PCT/US2018/060033
§ 371 (c)(1),
(2) Date: May 8, 2020

(87) PCT Pub. No.: WO2019/147322
PCT Pub. Date: Aug. 1, 2019

(65) Prior Publication Data
US 2020/0270140 A1    Aug. 27, 2020

Related U.S. Application Data

(60) Provisional application No. 62/584,376, filed on Nov. 10, 2017.

(51) Int. Cl.
*C01G 19/04* (2006.01)
*G21G 1/00* (2006.01)
*C01G 1/04* (2006.01)

(52) U.S. Cl.
CPC .............. *C01G 1/04* (2013.01); *G21G 1/001* (2013.01); *G21G 2001/0094* (2013.01)

(58) Field of Classification Search
CPC . C01G 19/04; G21G 1/001; G21G 2001/0094
See application file for complete search history.

(56) References Cited

U.S. PATENT DOCUMENTS

| | | | |
|---|---|---|---|
| 9,269,467 B2* | 2/2016 | Stevenson | G21G 1/10 |
| 2010/0064853 A1 | 3/2010 | Lapshina et al. | |
| 2017/0204497 A1* | 7/2017 | Crump | G21G 1/001 |

FOREIGN PATENT DOCUMENTS

WO    2016022515 A1    2/2016

OTHER PUBLICATIONS

Teo et al., "How flip teaching supports undergraduate chemistry laboratory learning", Chem. Educ. Res. Pract., 2014, 15, pp. 550-567. (Year: 2014).*
Synthesis of tin(IV) iodide, 3 pages, taken from http://educa.fc.up.pt/catalogo/assets/uploads/sintese_links/d136b-resumo_2_en.pdf, no date.*
International Search Report and Written Opinion in International Patent Application No. PCT/US2018/060033, dated Sep. 16, 2019, 11 pgs.

* cited by examiner

*Primary Examiner* — Anita Nassiri-Motlagh
(74) *Attorney, Agent, or Firm* — Wood Herron & Evans LLP

(57) ABSTRACT

Described are methods and compositions for processes of preparing a radioactive solution of Sn-117m tetraiodide. Aspects include reacting a radioactive solid Sn containing Sn-117m with a solution of $I_2$ in an organic solvent at a temperature and for a duration sufficient to result in the formation of Sn-117m tetraiodide. Then, the organic solvent is removed by evaporation to leave dry Sn-117m tetraiodide. The organic solvent is a low boiling point solvent capable of dissolving $I_2$ and Sn tetraiodide. The organic solvent is selected from the group consisting of an alcohol and a chlorinated solvent. In embodiments may be selected from the group consisting of dichloromethane, trichloromethane, tetrachloromethane, or mixtures thereof. In embodiments, the organic solvent excludes alcohol. The $I_2$ may be in a slight molar excess to the radioactive solid Sn. The method may further include distilling the reactants to remove excess $I_2$ from the distillate.

11 Claims, No Drawings

PROCESS FOR PRODUCING RADIOACTIVE DRY SN-117M TETRAIODIDE RADIOCHEMICAL

BACKGROUND

Radioactive Sn(IV)-117m is a critical starting material for radiopharmaceutical products. The radioactive metal can be used to label proteins and peptides for diagnostics and therapeutic purposes. In addition, it is being used as the radiochemical starting material to prepare particles useful to treating joint diseases such as arthritis.

In some processes, the radioactive Sn(IV)-117m is placed in a vial and the solvent removed. This dry form of Sn(IV)-117m has been produced from high specific activity Sn-117m (e.g. >500 Ci/g) for labeling proteins. In this process, which has been described previously, a Cd-116 target is bombarded with alpha particles and the resulting Sn-117m isolated from the target by dissolving with nitric acid and purifying via a column or by extraction into toluene after adding HI forming the Sn-tetraiodide. However, when low specific activity Sn-117m is prepared, typically from a metal target that is irradiated in a reactor, and it is dissolved in acid, the radioactive Sn becomes volatile and a significant amount of the isotope (50% or greater) evaporates during the drying process. Therefore, there is a need to produce radioactive Sn-117m in a dry form where little to no activity is lost due to evaporation during the drying process.

SUMMARY

Aspects of the invention provide solutions to the problem identified above. To this end, embodiments of the invention are directed to methods and compositions for processes of preparing a radioactive solution of Sn-117m tetraiodide. Aspects include reacting a radioactive solid Sn containing Sn-117m with a solution of $I_2$ in an organic solvent at a temperature and for a duration sufficient to result in the formation of Sn-117m tetraiodide. Then, the organic solvent is removed by evaporation to leave dry Sn-117m tetraiodide. The organic solvent is a low boiling point solvent capable of dissolving $I_2$ and Sn tetraiodide. The organic solvent is selected from the group consisting of an alcohol and a chlorinated solvent. In embodiments may be selected from the group consisting of dichloromethane, trichloromethane, tetrachloromethane, or mixtures thereof. In embodiments, the organic solvent excludes alcohol. The $I_2$ may be in a slight molar excess to the radioactive solid Sn. The method may further include distilling the reactants to remove excess $I_2$ from the distillate.

DETAILED DESCRIPTION

Aspects of the present invention are based on the inventors' discovery that Sn metal reacts with $I_2$ in organic solvent and produces a species, believed to be $SnI_4$, that does not volatilize during the evaporation process.

In an embodiment of the process, the reaction is run by adding to a sample of Sn a stoichiometric amount of $I_2$ dissolved in an organic solvent and heating the reactants to a temperature and for duration sufficient to complete the reaction of Sn with $I_2$ to result in the reactant that does not volatilize during the evaporation process. In embodiments of the invention, the reaction is heated under reflux.

In an embodiment, the Sn is radioactive. In another embodiment, the radioactive Sn that includes Sn-117m. In yet another embodiment, the radioactive Sn that includes Sn(IV)-117m. In embodiments of the invention, the radioactive Sn has a low specific activity, e.g., a specific activity less than 20 Ci/g.

The organic solvent may be any low boiling point solvent that dissolves both $I_2$ and the product of the reaction between $I_2$ and Sn, such as $SnI_4$. Prior to oxidation with $I_2$, Sn metal will not dissolve in the organic solvent. However, after oxidation, the reaction product will go into solution in the solvent. In an embodiment, the solvent is an alcohol, a chlorinated solvent, or combinations thereof. Exemplary chlorinated solvents include dichloromethane, trichloromethane, tetrachloromethane, or mixtures thereof. In another embodiment, the solvent is dichloromethane. An exemplary alcohol is ethanol. However, ethanol has a propensity to absorb water from the atmosphere, which can be problematic. Accordingly, in embodiments of the invention, ethanol is excluded as a solvent or ethanol is used as a solvent under conditions to prevent absorption of atmospheric water.

In embodiments of the invention, the temperature for the reaction may be from room temperature to a temperature greater than room temperature, such as the boiling point of the organic solvent. In embodiment, the reaction is run at reflux. Accordingly, in this embodiment, the temperature of the reaction may be the boiling point of the low organic solvent. In an exemplary embodiment in which the solvent is methylene chloride, the temperature for the reaction is about 40 degrees Celsius. After allowing the reaction to proceed at an elevated temperature for a desired duration, the mixture may be allowed to cool to room temperature such as allowing the reaction to proceed without input of additional heat overnight. If the reaction is not complete during the time that the reaction is run at an elevated temperature, the reaction may reach completion during the cool down duration.

In an embodiment, the duration to complete the reaction is in a range from 1 hour to 4 hours, and in an alternative embodiment, the duration is in a range from 2 hours to 3.5 hours, and in another alternative embodiment, the duration is about 3 hours, plus or minus 15 minutes. Alternatively, the reaction can be run at lower temperatures, e.g. room temperature for longer times. Also, the form of the solid Sn metal target can affect the reaction time. For example, using powdered Sn metal would greatly increase the surface area of the Sn and speed up the reaction, whereas using chunks of Sn with decreased surface area, would slow down the reaction.

In embodiments of the invention, a slight excess of $I_2$ can be used to ensure complete conversion of the Sn metal to the tetraiodide. In an embodiment, the slight excess of $I_2$ is an excess that does not exceed 10% more than the stoichiometric amount and in an alternative embodiment, the slight excess of and the excess of $I_2$ is an excess that does not exceed 5% more than the stoichiometric amount. In embodiments in which an excess of $I_2$ is utilized, the excess $I_2$ may be removed by distillation with addition of more solvent if needed. Generally speaking, the distillation process may be continued, with the addition of additional organic solvent, until the distillate appears clear, which indicates that the excess $I_2$ has been sufficiently removed. Conversely, the reaction can be run with an excess of Sn metal. In that case some of the metal will not react and can be recovered and reprocessed at a later time.

When Sn is reacted as described above, the solution can be turned into a solid by removing the solvent. Solvent can be removed at room temperature by using an unsealed vial and allowing the solvent to evaporate or heating the vial to make the solvent evaporate more quickly, such as by heating the vial to 100 degrees Celsius. Thus, in an embodiment, the solvent is evaporated over a temperature range from room temperature to 100 degrees Celsius. The solvent may be captured, such as with a condensation coil, for recycling or disposal. When the process is performed as described above, it is possible to prepare a solid Sn product without loss due to evaporation, and when the Sn is a radioactive Sn, such as Sn-117m or, more particularly, Sn(IV)-117m, such as a low specific activity Sm-117m, the product can then be used to prepare radiopharmaceutical products. An exemplary radiopharmaceutical product includes particulate Sn-117m materials that can be used to treat arthritis.

A benefit of the current process is that it results in a dry Sn product that does not result in loss of specific activity when using radioactive Sn. Another benefit is that removing the solvent by evaporation results in a dry Sn compound that can be resuspended in the correct type of solution and volume to run later reactions, such as reactions to produce radiopharmaceuticals, without resulting in undesired products or loss of specific activity. For example, if Sn is dissolved in 5 N HCl, the HCl would need to be removed. HCl could be removed by adding NaOH, but that would create salts, which may be undesirable. In addition, it may be desirable to reduce the volume of the starting Sn solution if it is too dilute. In practice, Sn is processed in one large solution. The evaporation process isolates varying activities of Sn having only Sn in one form. The final dried Sn will not contain varying amounts of salts or other materials that could interfere with later synthetic processes, such as the synthesis of radiopharmaceuticals. Another benefit of the process described herein is that it is consistent with most synthetic strategies.

Example 1 (Comparative)

A mass of 0.2 g of Sn metal was placed in a 15 mL plastic tube and dissolved in 2 mL of concentrated HCl overnight. Water was added to make a 4 M HCl solution. One mL of the Sn solution was placed in a 5 mL glass vial and the solution was heated to about 70° C. for about 3 hours until it was dry. The dry residue was reconstituted in 4 M HCl and 100 μL of 30% hydrogen peroxide was added to convert any Sn(II) to Sn(IV). A sample of the Sn(IV) was diluted for determination of Sn in the solution using inductively coupled plasma (ICP) with optical emission (ICP-OES). The results of the analysis showed that greater than 80% of the Sn had evaporated from the tube.

Example 2 (Comparative)

A solution of Sn-117m in 4 M HCl was obtained from Oak Ridge National Laboratories. A quantity of 20 mCi (measured by a dose calibrator) of the solution in approximately 0.5 mL was placed in a microwave tube equipped with a nitrogen stream at the top of the tube to help evaporation of the solution. The tube was heated to 70° C. while nitrogen gas was streamed over the solution at a flow rate sufficient to cause an observable disturbance of the surface of the solution. After 2 hours, the sample was observably dry and the activity measured using a dose calibrator. The amount of activity found in the tube after drying was less than 10 mCi.

Example 3 (Comparative)

Example 2 was repeated with the exception that the drying temperature was 50° C. After drying, only 12 mCi of Sn-117m remained in the tube.

Example 4

A mass of 0.2 g of Sn metal was placed in a round bottom flask with a 5% molar excess of solid $I_2$. A volume of 20 mL of dichloromethane was added and the mixture was heated to reflux for about 4 hours and the heat turned off. The round bottom flask was capped and the solution was stirred at room temperature overnight. Additional volumes of dichloromethane were added and removed by distillation to remove any excess $I_2$. This was repeated until the distillate turned colorless showing no more $I_2$ was being removed. The solvent was then removed by heating the solution at 60° C. to evaporate the dichloromethane. About 98% of the mass of Sn as the tetraiodide remained in the flask.

Example 5

A quartz vial containing about 200 mg of Sn(IV)-117m metal was measured in a dose calibrator showing about 300 mCi of Sn(IV)-117m. The Sn(IV)-117m metal was reacted as described in Example 4 to produce a dichloromethane solution of radioactive Sn-117m tetraiodide. The activity was measured to be 659 mCi using a calibrated Ge detector coupled to a multichannel analyzer. The difference in the two measurements was due to the shielding of the activity by the quartz vial plus self-shielding by the Sn(IV)-117m metal.

Table 1 shows the activity before and after evaporation of 4 separate aliquots of the above solution at 50° C.

| Dose Vial | Activity in $CH_2Cl_2$ (mCi) | Activity after Drying (mCi) |
|---|---|---|
| 1 (A) | 21.6 (@ 10:39 AM) | 27.4 (@ 12:52 PM) |
| 2 (B) | 22.1 (@ 10:44 AM) | 27.6 (@ 12:51 PM) |
| 3 (C) | 23.8 (@ 10:47 AM) | 30.1 (@ 12:52 PM) |
| 4 (D) | 24.8 (@ 10:57 AM) | 31.1 (@ 12:52 PM) |

As is evident from Table 1, there was no loss of radioactivity after drying when measuring using a dose calibrator. The increase in activity is due to less shielding from the dichloromethane solvent.

Example 6

The samples described in Example 5 were used to prepare Sn-117m containing radioactive particles and used for the treatment of arthritic conditions in Dogs.

What we claim:

1. A process for preparing dry Sn-117m tetraiodide comprising:
   reacting a radioactive solid Sn containing Sn-117m with a solution of $I_2$ in an organic solvent at a temperature and for a duration sufficient to result in the formation of Sn-117m tetraiodide; and
   evaporating the organic solvent to leave dry Sn-117m tetraiodide.

2. The process of claim 1 wherein the organic solvent is selected from the group consisting of an alcohol and a chlorinated solvent.

3. The process of claim 1 wherein the organic solvent is selected from the group consisting of dichloromethane, trichloromethane, tetrachloromethane, or mixtures thereof.

4. The process of claim 1 wherein the organic solvent is dichloromethane.

5. The process of claim 1 wherein the organic solvent excludes alcohol.

6. The process of claim 1 wherein the $I_2$ is in a slight molar excess to the radioactive solid Sn.

7. The process of claim 6 wherein the slight molar excess is a molar excess of 10%.

8. The process of claim 6 wherein the slight molar excess is a molar excess of 5%.

9. The process of claim 1 further comprising:
distilling the radioactive solid Sn containing Sn-117m and $I_2$ to remove excess $I_2$ from a distillate.

10. The process of claim 1 wherein the temperature for evaporating the solvent is from room temperature to 100 degrees Celsius.

11. A process for preparing a dry composition of Sn-117m in the form of Sn(IV) tetraiodide comprising:
reacting a radioactive solid Sn containing Sn-117m with a solution of $I_2$ in an organic solvent at a temperature and for a duration sufficient to result in the formation of Sn-117m tetraiodide, wherein the radioactive solid Sn has a specific activity of less than 20 Ci/g, and wherein the $I_2$ is in excess of the radioactive solid Sn; and
evaporating the organic solvent to leave dry Sn-117m tetraiodide that does not exhibit a loss of specific activity.

\* \* \* \* \*

UNITED STATES PATENT AND TRADEMARK OFFICE
CERTIFICATE OF CORRECTION

| | |
|---|---|
| PATENT NO. | : 11,807,546 B2 |
| APPLICATION NO. | : 16/762561 |
| DATED | : November 7, 2023 |
| INVENTOR(S) | : Zechariah David Sandlin et al. |

It is certified that error appears in the above-identified patent and that said Letters Patent is hereby corrected as shown below:

On the Title Page

Column 2, Abstract, Lines approx. 43-45, "In embodiments may be selected from the group consisting of dichloromethane, trichloromethane, tetrachloromethane, or mixtures thereof." should be
-- And, in certain embodiments, it may be selected from the group consisting of dichloromethane, trichloromethane, tetrachloromethane, or mixtures thereof. --.

In the Specification

Column 1, Lines 44-46, "In embodiments may be selected from the group consisting of dichloromethane, trichloromethane, tetrachloromethane, or mixtures thereof." should be -- And, in certain embodiments, it may be selected from the group consisting of dichloromethane, trichloromethane, tetrachloromethane, or mixtures thereof. --.

Column 1, Line 66, "the radioactive Sn that includes" should be -- the radioactive Sn includes --.

Column 1, Line 67, "the radioactive Sn that includes" should be -- the radioactive Sn includes --.

In the Claims

Column 5, Line 1 (Claim 6), "12" should be -- $I_2$ --.

Signed and Sealed this
Twenty-sixth Day of December, 2023

Katherine Kelly Vidal
*Director of the United States Patent and Trademark Office*